(12) United States Patent
Hagirahim

(10) Patent No.: US 7,006,490 B2
(45) Date of Patent: Feb. 28, 2006

(54) METHOD AND APPARATUS FOR PROVIDING EFFICIENT CIRCUIT SWITCH-TO-SWITCH COMMUNICATION

(75) Inventor: Hassan H. Hagirahim, Long Branch, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 888 days.

(21) Appl. No.: 09/827,847

(22) Filed: Apr. 6, 2001

(65) Prior Publication Data

US 2002/0145998 A1    Oct. 10, 2002

(51) Int. Cl.
*H04L 12/66* (2006.01)

(52) U.S. Cl. .................. 370/352; 370/401; 370/356; 370/395.2

(58) Field of Classification Search ............... 370/352, 370/401, 522, 252, 259, 285, 356, 230, 282, 370/395.2; 379/219, 27.01
See application file for complete search history.

(56) References Cited

U.S. PATENT DOCUMENTS

| | | | | |
|---|---|---|---|---|
| 6,282,192 B1 * | 8/2001 | Murphy et al. | ............. | 370/352 |
| 6,363,065 B1 * | 3/2002 | Thornton et al. | ........... | 370/352 |
| 6,404,746 B1 * | 6/2002 | Cave et al. | ................. | 370/262 |
| 6,542,499 B1 * | 4/2003 | Murphy et al. | ............. | 370/352 |
| 6,658,008 B1 * | 12/2003 | Hosein | ................. | 370/395.64 |
| 6,771,763 B1 * | 8/2004 | Hagirahim et al. | ......... | 379/219 |
| 6,888,794 B1 * | 5/2005 | Jovanovic et al. | .......... | 370/230 |

* cited by examiner

*Primary Examiner*—Wellington Chin
*Assistant Examiner*—Chuong Ho

(57) ABSTRACT

The invention comprises a system and method for transmitting and receiving between voice switches compressed multiplexed packets. The invention efficiently utilizes a Digital Signal Level Zero (DS0) to provide multiplexed voice traffic between two voice switches.

18 Claims, 5 Drawing Sheets

100

200

300

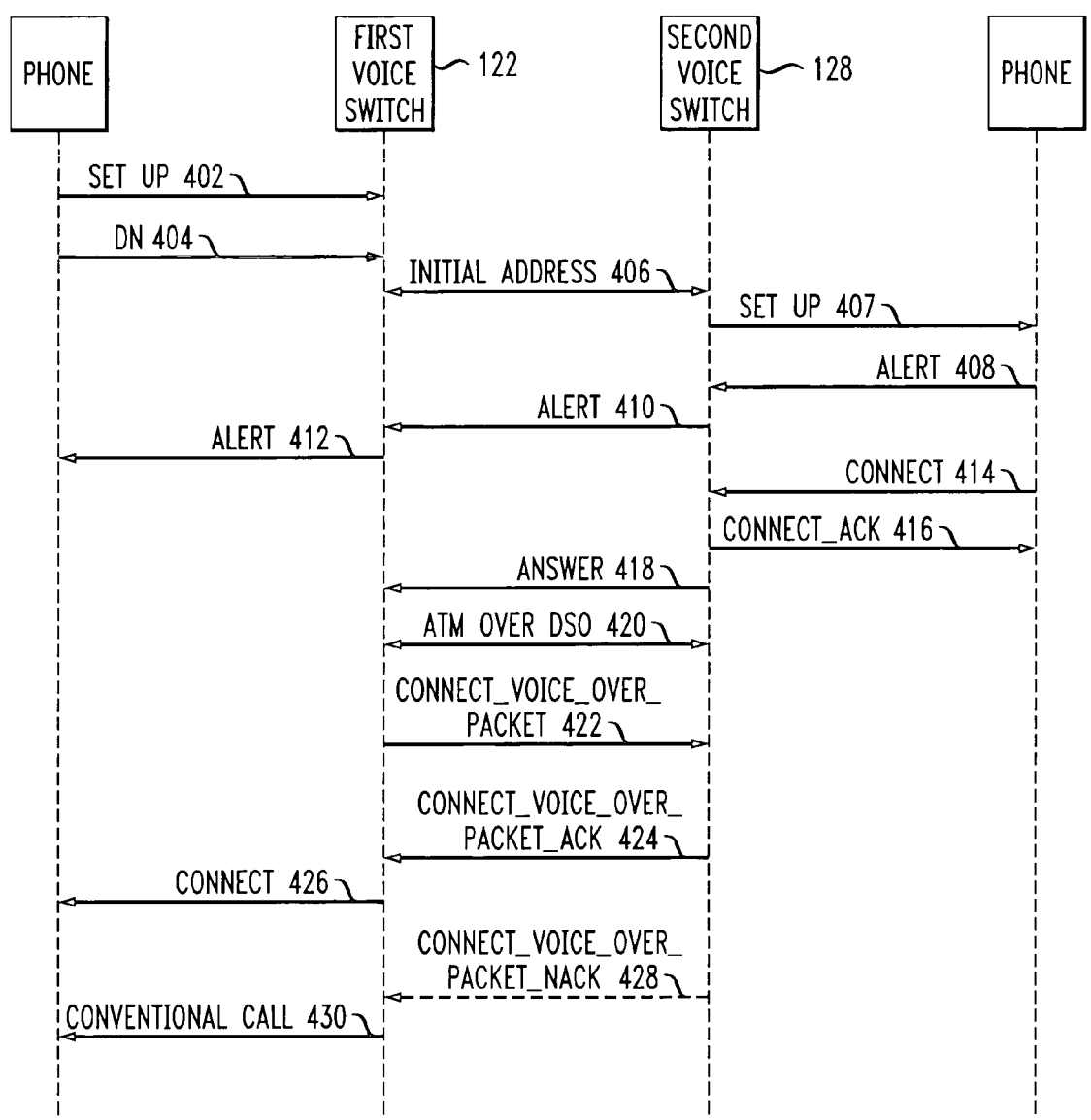

METHOD AND APPARATUS FOR PROVIDING EFFICIENT CIRCUIT SWITCH-TO-SWITCH COMMUNICATION

BACKGROUND OF THE DISCLOSURE

1. Technical Field of the Invention

This invention generally relates to the field of communication systems and, more particularly, to exchanging packets between voice switches over the Public Switch Telephone Network (PSTN).

2. Description of the Background Art

The Public Switch Telephone Network (PSTN) was initially developed to handle analog communications, such as voice communication (calls). For example, when a voice call is made, a signaling path is first established between the calling and called parties via local switches serving the respective parties. The signaling path provides audible indications such as dial tone, ringing or a busy signal indications to alert the calling party of the status of the call. If the called party picks up the phone, a voice path is then established between the calling and called party. Unfortunately, the voice path is "connection oriented," wherein a 64 kb/s channel (also known as a Digital Signal Level Zero (DS0) Channel), is established on a T1 trunk for the duration of the call. The calling and called parties utilize the same DS0 channel. This is an inefficient use of the bandwidth, since 64 kb/s of silence as well as 64 kb/s information is communicated across the link.

Presently, the communications field is evolving toward a "packet oriented" network. Technologies such as Digital Subscriber Line (DSL), wireless and cable telephony, for example, utilize a packet based system. Packet oriented technologies use different paths to communicate packets allowing packets to arrive out of order. The current methodology of communicating packets over a connection oriented system requires terminating the packets and converting the packets to a different format at the switch. Such processing leads to a large latency time and a deterioration of the signal.

SUMMARY OF THE INVENTION

The invention comprises a system and method for transmitting and receiving multiplexed traffic over the Public Switched Telephone Network that tends to avoid multiple transcoding of a speech signal. The invention advantageously provides efficient switch-to-switch communication by increasing capacity on a communication link where at least two conversations are transmitted between two voice switches. Additionally, an enhanced Quality of Service (QoS) is provided since there is no transcoding of signals and, therefore, no coding/decoding signal losses.

A method of transporting packets from a first voice switch coupled to a communication network, comprising receiving, at the first voice switch, information bearing packets from a first subscriber intended for routing to a second subscriber, and multiplexing said packets into a transport stream intended for a second voice switch serving said second subscriber, responsive to a determination that said first switch and said second switch are compatible, enabling the communication of said transport stream to said communication network.

An apparatus comprising a first voice switch for receiving information bearing packets from a first subscriber intended for routing to a second subscriber over a network, said first switch in response to a determination that said first switch and a respective second voice switch are compatible, multiplexing said packets into a transport stream intended for said second voice switch, enabling the communication of said transport stream to said communication network.

BRIEF DESCRIPTION OF THE DRAWINGS

The teachings of the present invention can be readily understood by considering the following detailed description in conjunction with the accompanying drawings, in which:

FIG. 4 depicts a call flow diagram useful in understanding the communications system of FIG. 1.

To facilitate understanding, identical reference numerals have been used, wherever possible, to designate identical elements that are common to the figures.

DETAILED DESCRIPTION OF THE INVENTION

The invention will be primarily described within the context of a pair of subscribers (A and B) communicating via a Public Switched Telephone Network (PSTN) utilizing different transport mediums, for example Digital Subscriber Line (DSL), Plain Old Telephone Service (POTS), cellular and cable modem technologies. It should be noted by those skilled in the art that the applicability of the present invention is not limited to this embodiment.

Figure 1:
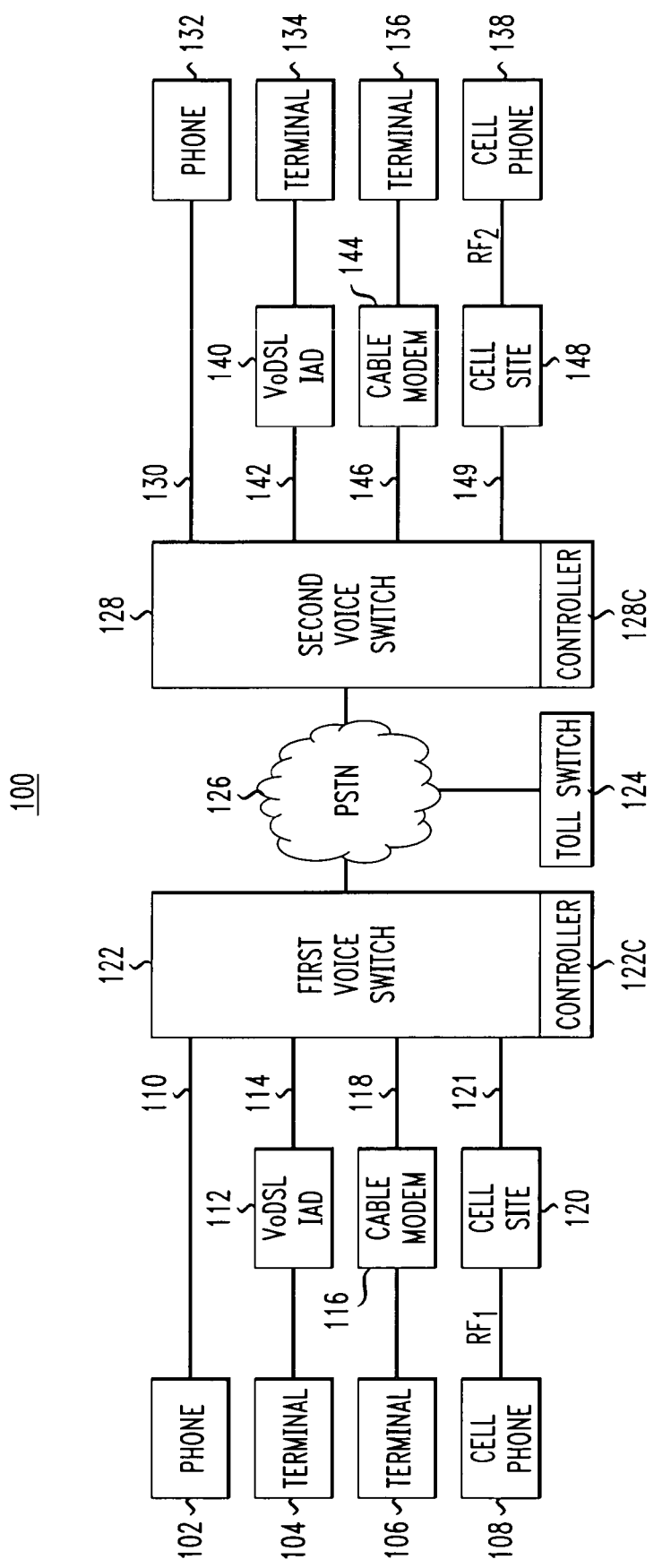
FIG. 1 depicts a high level block diagram of a communications system including the present invention.

FIG. 1 depicts a high level block diagram of a communications system including the present invention. Specifically, the system of FIG. 1 comprises a first voice switch 122 having a voice switch controller 122C. First voice switch 122 is coupled to a telephone 102 via a transmission medium 110 (illustratively, a copper pair, coaxial cable, fiber optic cable or the like), a first Voice over Digital Subscriber Service Line (VoDSL) Integrated Access Device (IAD) 112 via a transmission medium 114, a cable modem 116 via a transmission medium 118, and a first cellular site 120 via a transmission medium 121. First VoDSL IAD 112 is in turn coupled to a terminal 104 (illustratively, a telephone, a Personal Computer ((PC) or workstation). A terminal 106 is coupled to cable modem 116. A first cellular phone 108 is coupled to first cellular site 120 via a radio frequency ($RF_1$) link.

It should be noted that the present invention does not require a specific DSL service type, such as Asymmetric Digital Subscriber Line (ADSL), Rate Adaptive DSL (RADSL), Single-line DSL (SDSL), Integrated Services Digital Network (IDSL) and the like. Therefore, those skilled in the art and informed by the teachings of the present invention will be able to readily adapt any appropriate DSL service type to the present invention.

The first voice switch 122 is coupled to a public switched telephone network (PSTN) 126. Also coupled to the PSTN 126 is a second voice switch 128. Second voice switch 128 is coupled to a telephone 132 via a transmission medium 130, a second Voice over Digital Subscriber Service Line (VoDSL) Integrated Access Device (IAD) 140 via a transmission medium 142, a second cable modem 144 via a transmission medium 146, and a second cellular site 148 via a transmission medium 149. Second VoDSL IAD 140 is in turn coupled to a terminal 134. In addition, a terminal 136 is coupled to second cable modem 144, and a second cellular phone 138 is coupled to second cellular site 148 via a radio frequency ($RF_2$) link. An optional toll switch 124 for routing long distance calls is also coupled to PSTN 126.

It should be noted that the operation of the first voice switch 122 is similar to the operation of the second voice switch 128. As such, only differences between the first voice switch 122 and the second voice switch 128 will be described in more detail.

As a call arrives at the first voice switch 122 from a digital device, for example from a DSL subscriber, the cellular user and/or cable modem user, the call arrives in packetized form, compressed according to a low bit rate voice coding. For example, the packets can arrive at first voice switch 122 compressed according to the International Telecommunication Union—Telecommunication Standardization Sector (ITU-T) G.728, G.729, G.723.1 and Enhanced Variable Rate Coding (EVCR) standards, which are hereby incorporated by reference in their entirety.

The call information contains the calling party's and the called party's directory number (DN). The DN is based on the E.164 protocol, which is more thoroughly described in International Telecommunication Union—Telecommunication Standardization Sector (ITU-T) TS documents, which are hereby incorporated by reference in their entirety. The DN comprises an area code, an exchange and a line number. For example, in the telephone number (123) 456-7890, 123 is the area code; 456 is the exchange; and 7890 is the line number. Specifically, the area code is the calling region; the exchange is a particular local switch within the called area code; the line number is the number assigned to the called party by the local switch.

By examining the call request, first switch 122 determines the exchange of the called party, which, illustratively, is second switch 128. A determination is then made as to whether any calls are in progress between first switch 122 and second switch 128. For the initial call, a signaling path is established between first switch 122 and second switch 128 in a conventional manner via the PSTN 126. For instance, the call can be established using signaling system seven (SS7). Alert information such as dial tone, busy signal and audible ringing can be communicated to both the called or calling party. When the called party answers the phone, a Digital Signal Level Zero (DS0) communications link is established in a conventional manner.

A compatibility check is made between first voice switch 122 and second voice switch 128, wherein signaling messages are exchanged between the two switches. If the two switches are not compatible in terms of packet compression and/or protocol, the call will be handled in a conventional manner in which one DS0 will be assigned to the called and calling party for the duration of the call.

If the two switches are compatible, a packet transport medium will be established enabling the communication of a transport stream between the two switches. In an embodiment of the present invention, an Asynchronous Transfer Mode (ATM) channel will be established over the DS0 serving the first voice switch 122 and second voice switch 128. In establishing the ATM channel over the DS0 channel, a physical ATM layer, an ATM layer and an ATM Adaptation Layer Type 2 (AAL2) data structure are implemented over the DS0. The AAL2 data structure, which will be described more fully with reference to FIG. 3 below, serves as a transport packet for transporting packets between first switch 122 and second voice switch 128.

It will be appreciated by those skilled in the art that other forms of packet transport can be substituted and still fall within the scope of the invention.

In one embodiment, the AAL2 data structure allows the compression of packet information which is communicated between first switch 122 and second switch 128. As additional calls are established between first switch 122 and second switch 128, the calls are assigned to the AAL2 data structure. Specifically, as additional calls are established, first switch 122 keeps track of calls being routed to different exchanges. When a new call arrives at first switch 122, whose destination is the same exchange as a call currently in progress, the new call will be multiplexed onto the AAL2 data structure currently being utilized between the switches. Each call communicated via the AAL2 data structure has an identifier to insure each multiplexed call can be individually identified.

In another embodiment, for incoming analog calls, the analog voice is packetized at first switch 122 and the packetized voice is communicated to second switch 128 via the AAL2 data structure. Additional analog calls between first voice switch 122 and second voice switch 128 can be packetized and multiplexed onto the AAL2 data structure.

At second switch 128, the multiplexed traffic contained in the AAL2 data structure is demultiplexed and/or decompressed the individual traffic is routed to its respective destination.

In another embodiment, analog traffic that has been packetized is demultiplexed and/or decompressed at second switch 128 and routed to its respective destination.

It will be appreciated by those skilled in the art that although the invention is described in the context of two switches, the invention can be practiced with one switch. For instance, both the calling and calling party can be served out of the same switch. Thus, only the use of one switch will be required.

It will also be appreciated by those skilled in the art that first voice switch 122 and second voice switch 128 can be local exchange switches.

It should be noted by those skilled in the art that although the invention is described in the context of a call being established in one direction, the call can be established in either direction and communication between the respective gateways 122 and 128 can occur simultaneously according to the present invention. Moreover, any communication devices may be supported.

Figure 2:
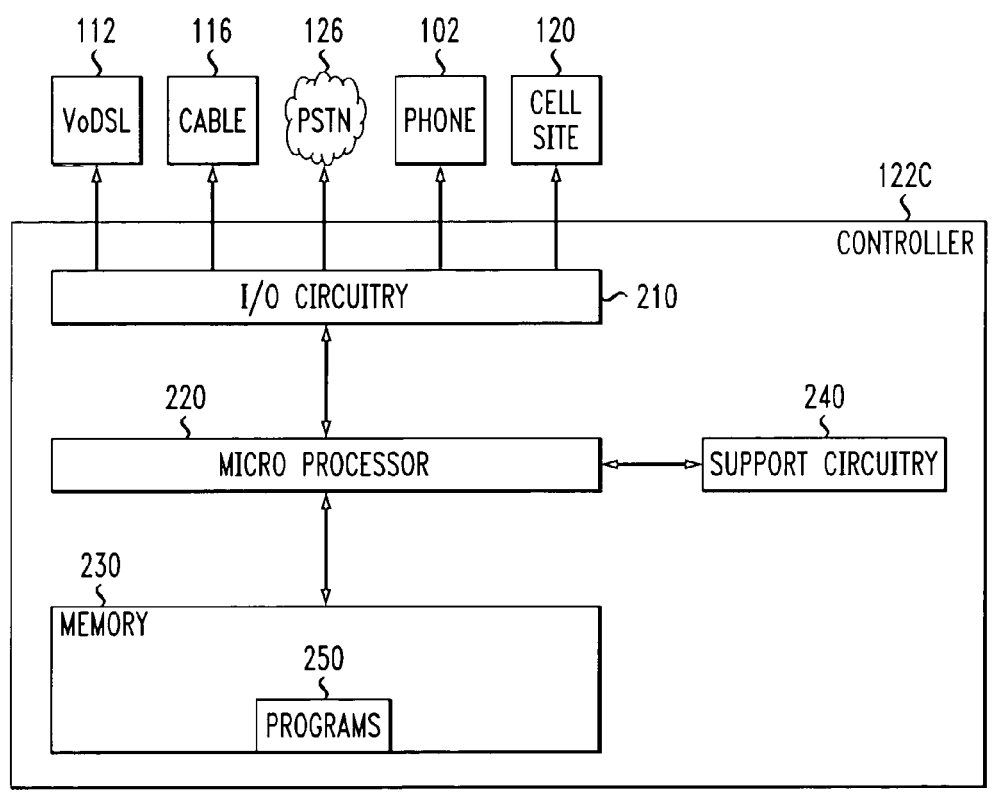
FIG. 2 depicts a high level block diagram of an embodiment of a controller suitable for use within a Voice over Digital Subscriber Line (VoDSL) gateway.

FIG. 2 depicts a high level block diagram of an embodiment of the controller suitable for use within a voice switch. Specifically, FIG. 2 depicts a high level block diagram of a voice switch 122 suitable for use in the communication system 100 of FIG. 1. The voice switch controller 122C comprises a microprocessor 220 as well as memory 230 for storing programs 250 such as call processing method 500 which will be described more fully below in a discussion of FIG. 5. The microprocessor 220 cooperates with conventional support circuitry 240 such as power supplies, clock circuits, cache memory and the like as well as circuits that assist in executing the software methods of the present invention.

The voice switch controller 122C also comprises input/output circuitry 210 that forms an interface between the microprocessor 220, the PSTN 126, telephone 102, VoDSL IAD 112, cable RG 116, cellular site 120, and other VoIP circuitry (not shown).

Although the voice switch controller 122C is depicted as a general purpose computer that is programmed to perform voice and data packet control and processing functions in accordance with the present invention, the invention can be implemented in hardware, in software, or a combination of hardware and software. As such, the processing steps described above with respect to the various figures are intended to be broadly interpreted as being equivalently performed by software, hardware, or a combination thereof. It will be appreciated by those skilled in the art that the voice switch controller 122C provides sufficient computer functionality to implement the invention as described above.

Figure 3:
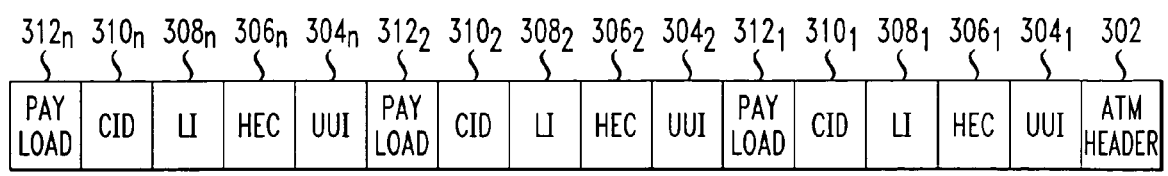
FIG. 3 depicts a diagram of an Asynchronous Transfer Mode Adaptation Layer 2 (AAL2) packet data structure useful in understanding the operation of the communications system of FIG. 1.

FIG. 3 depicts a diagram of an AAL2 packet data structure useful in understanding the operation of the communications system of FIG. 1. Specifically, FIG. 3 shows the packet data structure of the Common Part Sub-layer (CPS) of an AAL2 packet 300 that may be used in the communications system of FIG. 1. This structure may be used in communications between the first IAD 110 and first voice switch 150, and communications between the second IAD 210 and second voice switch 170. Any differences between the standard AAL2 packet structure and the packet structure of FIG. 3 comprise data structure modification according to the present invention.

The CPS of an AAL2 packet 300 comprises an ATM Header 302 for routing the packet through an ATM network, an AAL2 header 303 and AAL2 payload fields $312_1, 312_2$ up to $312_n$ (collectively AAL2 payload) including packets associated with a compressed voice communication. An AAL2 header 303 comprises a User-to-User Indicator (UUI) fields $304_1, 304_2$, up to $304_n$ for providing a link between the CPS sub-layer and a Service Specific Convergence sub-layer (SSCS) of the AAL2 packet, Header Error Check (HEC) fields $306_1, 306_2$, up to $306_n$ for identifying errored cellulars, Length Indicator (LI) fields $308_1, 308_2$ up to $308_n$ for identifying the length of the packet payload 312 associated with each individual user and Channel Identifier (CID) fields $310_1, 310_2$ up to $310_n$ for identifying the individual channels within the AAL2 packet.

As incoming calls are established at first voice switch 122, each call, including audio information, is multiplexed onto the plurality of AAL2 transport packets. Specifically, each call is multiplexed onto a respective payload field 312 forming a transport stream. More specifically, as the plurality of AAL2 transport packets are being communicated between first voice switch 122 and second voice switch 128, signaling occurs on the ATM channel rather than on the SS7 channel. For instance, the channel identifier field 310 is used to determine which callers have connected or disconnected a call.

FIG. 4 depicts a call flow diagram useful in understanding the communications system of FIG. 1. Specifically, the call flow diagram 400 begins with Party A initiating a digital phone call by picking up the first cellular phone 108 and dialing subscriber B's phone number at step 402. This communicates a setup message to first voice switch 122.

At step 404, first switch 122 examines the call setup message and retrieves the DN. The DN contains the exchange of the local switch serving subscriber B which, illustratively, is second voice switch 128.

At step 406, the initial address of the called party is communicated between first voice switch 122 and second voice switch 128 in a conventional manner. For instance, a signaling system such as SS7 or the like can be used to convey calling information between the switches.

At step 407, second voice switch 128 communicates a Setup message to Subscriber B's phone.

At step 408, an Alert message is communicated from Subscriber B's phone to second switch 128. The alert message is in response to the Setup message from second voice switch 128 to Subscriber B's phone.

In response to receiving an Alert message from subscriber B's phone, the second voice switch 128 communicates the Alert message to first switch 122 at step 410.

At step 412, first voice switch 122 communicates the Alert message to Subscriber A's phone which indicates that second voice switch 128 has communicated Subscriber A's request to Subscriber B.

At step 414 Subscriber B's phone communicates a Connect message to subscriber B responsive to Subscriber B answering the phone call. In response to Subscriber B answering the phone second voice switch 128 communicates a Connect_ACK message to subscriber B's phone at step 416.

At step 418 second voice switch 128 communicates an Answer message to first voice switch 122, which indicates that Subscriber B has answered the phone. No notification is sent to subscriber A that subscriber B has answered the phone.

At step 420, an ATM physical layer is established over a DS0 channel. In response to establishing the ATM physical layer, at step 426, an ATM logical layer is established over the ATM physical layer. The physical and logical ATM layers establish handshaking between the two switches, and establish the ATM features provided by the switches.

At step 422, a compatibility check will be made between first switch 122 and second switch 128 to determine whether second switch 128 is capable of establishing the AAL2 parameters of the call e.g., voice coding bit rate, call identifier, etc. First switch 122 communicates a Connect_Voice Over Packet (CID, Coding) message to second switch 128.

At step 424, second switch 128 communicates a Connect_voice_over_Packet_ACK message to first switch 122, indicating that second switch 128 can accommodate the negotiated voice coding rate. For example, the packetized information can be sent at different compressed rates. If the compressed rate selected by first switch 122 can be accommodated by second switch 128, second switch 128 communicates an acknowledgement message to first switch 122.

In response to receiving an acknowledgement message from second switch 128, first switch 122 communicates a connect message to subscriber A, at step 426, indicating that subscriber A and subscriber B have been connected.

Alternatively, at step 428, second switch 128 communicates a Connect_Voice_Over_Packet_NACK message to first switch 122, indicating that second voice switch 128 is not capable of handling a packet over voice call.

First switch 122, in turn, at step 430 will seek to establish the call in a conventional manner.

Figure 5A:
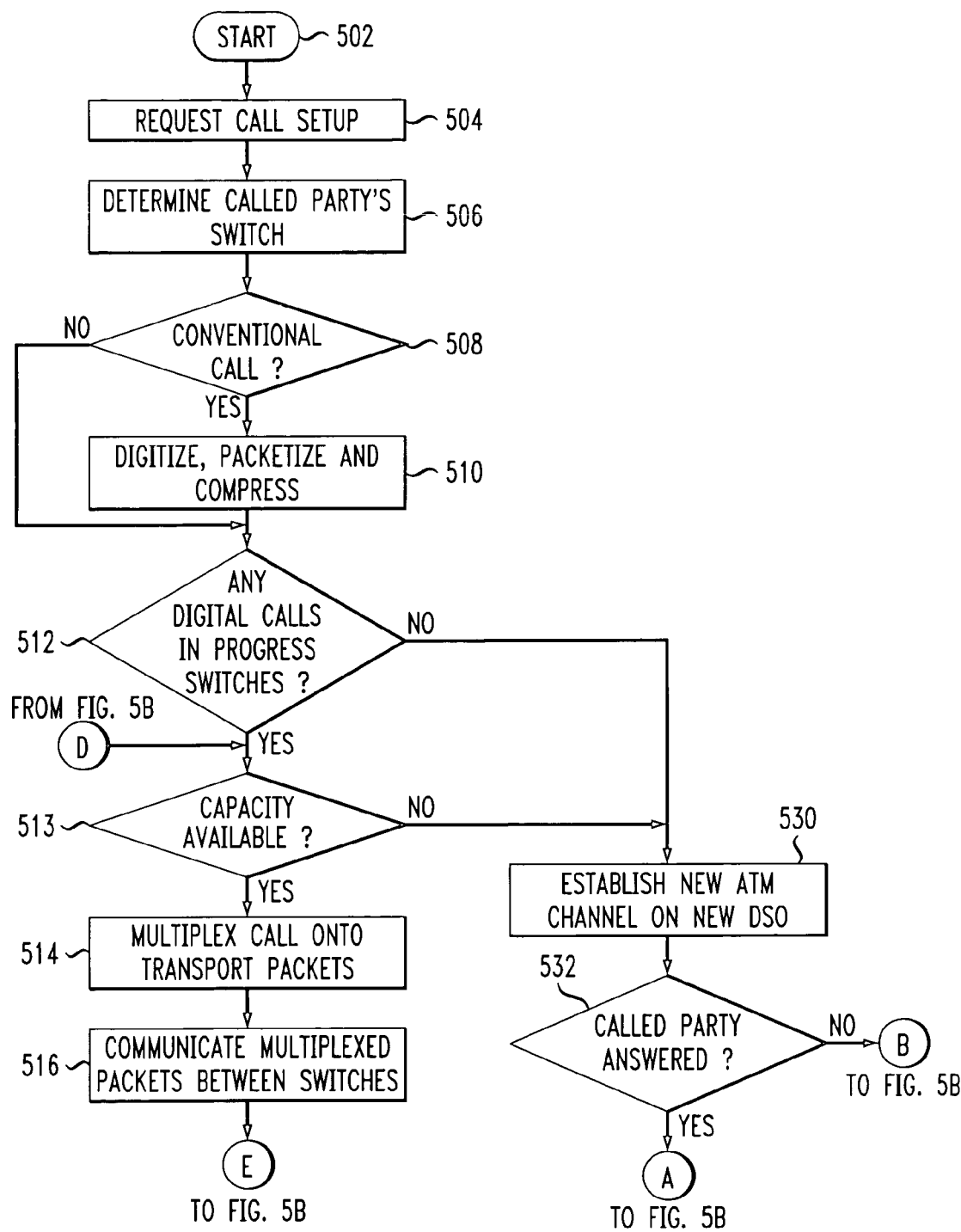
FIGS. 5A and 5B depict a flow diagram useful in understanding an embodiment of the present invention.
Figure 5B:
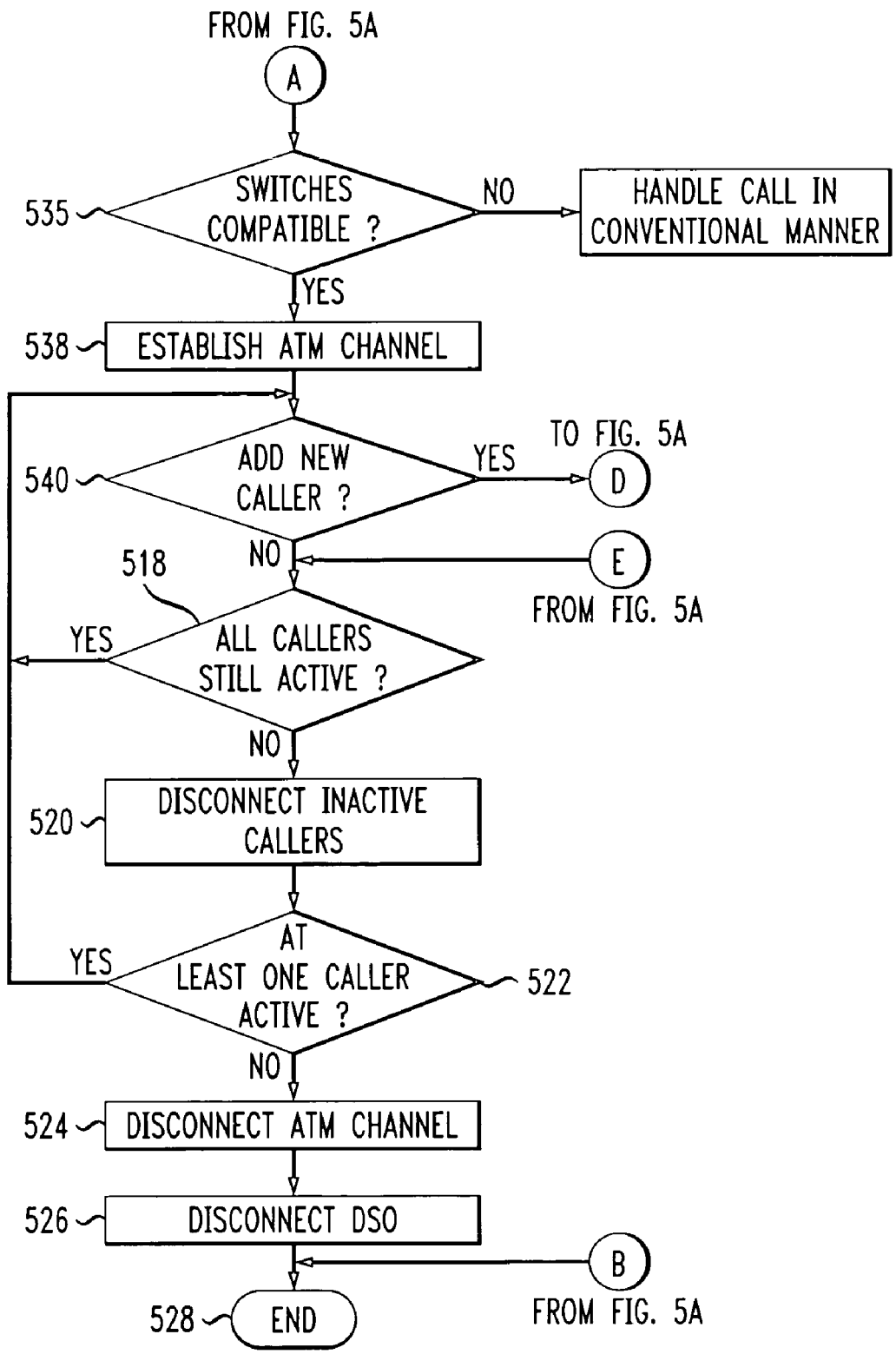

FIG. 5 depicts a flow chart useful in understanding an embodiment of the present invention. Specifically, method 500 depicts a flow diagram of a method for providing voice switch to voice switch communication according to the invention. The method 500 of FIG. 5 may be stored in the voice switch controller 122C in, for example, memory 230 within the portion used for storage of various programs 250.

The method 500 is initiated at step 502 and proceeds to step 504, where the first voice switch 122 receives a request from a source to connect to a respective destination. It should be noted that the first voice switch 122 may also receive multiple requests from multiple sources for connections to multiple destinations.

At step 506 the location of the serving switch is determined. Specifically, the call setup information will contain the DN, which contains the calling party's number and the called party's number. The called party number will contain the exchange which is the voice switch serving the called party. The method 500 then proceeds to step 508.

At step 508 a query is made as to whether the call is a conventional call. If the query at step 508 is answered affirmatively, the method proceeds to step 510 where the analog call is digitized and packetized. The call is also compressed to efficiently utilize the bandwidth of a channel. If the query at step 508 is answered negatively, the method 500 proceeds to step 512.

After determining that the call is not a conventional call (step 508) or after digitizing, packetizing and compressing a conventional call (step 510), the method 500 proceeds to step 512 where a query is made as to whether any digital calls are currently in progress between first switch 122 and second voice switch 128. First voice switch 122 keeps track of all calls currently in progress between first switch 122 and all other switches. If the query at step 512 is answered affirmatively, the method 500 proceeds to step 514. If the query at step 512 is answered negatively, the method 500 proceeds to step 530.

At step 530 a determination is made to establish a new ATM channel on a new DS0 channel. This means that the previous DS0 and/or ATM channel did not have enough capacity to accommodate the new caller. Therefore a new DS0 and ATM channel had to be established. The method 500 then proceeds to 532.

At step 532 a query is made as to whether the called party answers. If the query at step 532 is answered negatively, the method proceeds to step 528. If the query at step 532 is answered affirmatively, the method proceeds to step 534.

At step 534 a query is made to determine the compatibility between the voice switches. If the query at step 534 is answered negatively, the method proceeds to step 536 where the call is handled in a conventional manner. Specifically, first voice switch 122 communicated a Connect_Voice_Over_Packet (CID, Coding) message to second voice switch 128. Second voice switch 128 replied with a Connect_Voice_Over_Packet_NACK message, which means that second voice switch 128 can not handle multiplexed traffic and/or the compressed voice rate.

If the query at step 534 is answered affirmatively, the method proceeds to step 548 where an ATM layer is established. This implies that when first voice switch 122 communicated a Connect Voice_Over_Packet (CID, Coding) message to second voice switch 128, second voice switch 128 responded with a Connect_Voice_Over_Packet_ACK message allowing the ATM layer to be established on a DS0 channel between first voice switch 122 and second voice switch 128. The ATM layer comprises a physical ATM layer, a logical ATM layer and an AAL2 layer. Signaling will now occur on the AAL2 layer, and the call will be communicated between first voice switch 122 and second voice switch 128 using the plurality of transport packets 300. The method 500 then proceeds to step 542.

At step 540 a query is made as to whether any new callers need to be added. If the query is answered negatively, the method proceeds to step 518. If the query at step 540 is answered affirmatively indicating that a new caller needs to be added, the method proceeds to step 513.

At step 513 a query is made as to whether there is enough capacity on the present DS0 channel. If the query at step 513 is answered negatively, the method proceeds to step 530. If the query at step 513 is answered affirmatively, the method proceeds to step 514.

At step 514 the new call is multiplexed onto the plurality of AAL2 transport packets 300. As discussed earlier, each call is identified by the call identifier field 310. Therefore, the new call will have it's own call identifier field 310, uniquely identifying that particular call. The method 500 then proceeds to step 516.

At step 516, the call is communicated between first voice switch 122 and second voice switch 128 via the plurality of AAL2 transport packets. The method 500 then proceeds to step 518.

At step 518 a query is made as to whether all callers are still active. If the query at step 518 is answered affirmatively, the method proceeds to step 540. If the query at step 518 is answered negatively, the method proceeds to step 520 where any inactive callers are dropped and the inactive caller's respective call identifier 310 is released and made available for assignment to future callers. The method 500 then proceeds to step 522.

At step 522 a query is made as to whether at least one caller is active. If the query at step 522 is answered affirmatively, the method proceeds to step 540. If the query is answered negatively, the method proceeds to step 524.

At step 524 a determination is made to disconnect the ATM channel. The ATM physical, AAL2 and ATM logical layers are disconnected. The method 500 then proceeds to step 526.

At step 526 a determination is made to disconnect the DS0 channel. This breaks the complete call allowing the DS0 to be used for other calls. The method 500 then proceeds to step 528 where the process ends.

The above-described invention advantageously provides a means of communicating voice traffic between voice switches in packetized form. Moreover, the invention advantageously does not require a conversion of the voice traffic from a packet format to a PCM format between switches. In this manner, the invention provides a substantial improvement over prior art voice switch to voice switch communication; thereby providing an improved voice quality signal. The invention advantageously provides enhanced Quality of Service (QoS) by opportunistically avoiding signal degradation where voice switch to voice switch communications may be provided.

Although various embodiments which incorporate the teachings of the present invention have been shown and described in detail herein, those skilled in the art can readily devise many other varied embodiments that still incorporate these teachings.

I claim:

1. A method of transporting packets from a first voice switch coupled to a communication network, comprising:
   receiving, at the first voice switch, information bearing packets from at least one of a plurality of transport mediums of a first subscriber intended for routing to a second subscriber;
   determining if a transport stream exists between the first voice switch and a second voice switch serving said second subscriber;
   determining if the first voice switch and the second voice switch are compatible;
   establishing the transport stream responsive to a determination that the first switch and the second switch are compatible, wherein said establishing comprises:

establishing an Asynchronous Transfer Mode physical layer;

establishing an Asynchronous Transfer Mode logical layer over the Asynchronous Transfer Mode physical layer; and establishing an Asynchronous Transfer Mode Adaptation Layer 2 (AAL2) layer over the Asynchronous Transfer Mode logical layer; and multiplexing said packets onto the transport stream as AAL2 packets adapted for transmission over the Asynchronous Transfer Mode Adaptation Layer 2 (AAL2) layer, said AAL2 packets intended for the second voice switch serving the second subscriber.

2. The method of claim 1, wherein each of said AAL2 packets comprises:
a caller identifier field for identifying a caller.

3. The method of claim 1, wherein each of said AAL2 packets comprises:
a length indicator field for identifying the size of a payload.

4. The method of claim 2, wherein each of said AAL2 packets comprises:
a header error check field for identifying errors in the call identifier field.

5. The method of claim 1, wherein each of said AAL2 packets comprises:
a payload field for transporting said packets.

6. The method of claim 1, wherein each of said AAL2 packets comprises:
a User-to-User Indicator field for providing a link between a CPS sub-layer and a Service Specific Convergence sub-layer (SSCS) of each AAL2 packet.

7. The method of claim 1, wherein said packets are compressed voice packets.

8. The method of claim 1, wherein at least one of said voice switches is a private branch exchange (PBX).

9. The method of claim 1, wherein at least one of said first and second switches is a local exchange.

10. A method of transporting voice traffic between a first voice switch, over a Public Switched Telephone Network (PSTN), to a second voice switch, comprises:
receiving, at the first voice switch servicing a first subscriber, an analog voice call from the first subscriber for routing to a second subscriber;
digitizing said voice traffic;
packetizing said digitized traffic;
compressing said packetized traffic;
multiplexing said packets onto a transport stream containing packets from at least one of a plurality of non-analog based voice calls intended for a second voice switch serving said second subscriber, responsive to a determination that said first switch and said second switch are compatible; and
enabling the communication of said transport stream packets to said PSTN by establishing a packet transport medium, wherein said establishing said packet transport medium comprises:
establishing an Asynchronous Transfer Mode physical layer;
establishing an Asynchronous Transfer Mode logical layer over the Asynchronous Transfer Mode physical layer;
establishing an Asynchronous Transfer Mode Adaptation Layer 2 (AAL2) layer over the Asynchronous Transfer Mode logical layer; and
mapping the transport stream packets into AAL2 packets adapted for transmission over the Asynchronous Transfer Mode Adaptation Layer 2(AAL2) layer.

11. The method of claim 10, wherein each of said AAL2 packets comprises at least one of:
a call identifier field for identifying a caller;
a length indicator field for identifying the size of a payload;
a header error check field for identifying errors in the call identifier field; and
a payload field for transporting said packets,
a User-to-User Indicator field for providing a link between a CPS sub-layer and a Service Specific Convergence sub-layer (SSCS) of the AAL2 packets.

12. The method of claim 10, wherein at least one of said voice switches is a private branch exchange (PBX).

13. The method of claim 10, wherein at least one of said first and second switches is a local exchange.

14. An apparatus comprising:
a first voice switch for receiving information bearing packets from at least one of a plurality of transport mediums of a first subscriber intended for routing to a second subscriber over a network;
said first switch adapted for:
determining if a transport stream exists between the first voice switch and a second voice switch serving said second subscriber;
determining if the first voice switch and the second voice switch are compatible;
establishing the transport stream responsive to a determination that the first switch and the second switch are compatible, wherein said establishing comprises:
establishing an Asynchronous Transfer Mode physical layer;
establishing an Asynchronous Transfer Mode logical layer over the Asynchronous Transfer Mode physical layer; and
establishing an Asynchronous Transfer Mode Adaptation Layer 2 (AAL2) layer over the Asynchronous Transfer Mode logical layer; and
multiplexing said packets onto the transport stream as AAL2 packets adapted for transmission over the Asynchronous Transfer Mode Adaptation Layer 2 (AAL2) layer, said AAL2 packets intended for the second voice switch serving the second subscriber.

15. The apparatus of claim 14, wherein each of said AAL2 packets comprises at least one of:
a call identifier field for identifying a caller;
a length indicator field for identifying the size of a payload;
a header error check field for identifying errors in the call identifier field;
a payload field for transporting said packets; and
a User-to-User Indicator field for providing a link between a CPS sub-layer and a Service Specific Convergence sub-layer (SSCS) of the AAL2 packets.

16. The apparatus of claim 14, wherein said packets are compressed voice packets.

17. The apparatus of claim 14, wherein at least one of said voice switches is a private branch exchange (PBX).

18. The apparatus of claim 14, wherein at least one of said voice switches is a local exchange switch.

* * * * *